United States Patent
Yang et al.

(10) Patent No.: US 10,324,942 B2
(45) Date of Patent: Jun. 18, 2019

(54) SEGMENT DATA VISIBILITY AND MANAGEMENT IN A DISTRIBUTED DATABASE OF TIME STAMPED RECORDS

(71) Applicant: SNAP INC., Santa Monica, CA (US)

(72) Inventors: Fangjin Yang, San Francisco, CA (US); Eric Tschetter, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 509 days.

(21) Appl. No.: 14/444,888

(22) Filed: Jul. 28, 2014

(65) Prior Publication Data

US 2015/0032775 A1    Jan. 29, 2015

Related U.S. Application Data

(60) Provisional application No. 61/914,126, filed on Dec. 10, 2013, provisional application No. 61/858,876, filed on Jul. 26, 2013.

(51) Int. Cl.
*G06F 17/30* (2006.01)
*G06F 16/2458* (2019.01)

(52) U.S. Cl.
CPC .................. *G06F 16/2477* (2019.01)

(58) Field of Classification Search
None
See application file for complete search history.

(56) References Cited

U.S. PATENT DOCUMENTS

| 8,112,425 | B2 * | 2/2012 | Baum | G06F 17/30551 707/746 |
| 8,745,014 | B2 * | 6/2014 | Travis | G06F 17/30551 707/700 |
| 9,002,854 | B2 * | 4/2015 | Baum | G06F 17/30551 707/746 |
| 9,069,824 | B2 * | 6/2015 | Pompey | G06F 17/30551 |
| 2010/0082705 | A1 * | 4/2010 | Ramesh | G06F 17/30471 707/808 |
| 2011/0218978 | A1 * | 9/2011 | Hong | G06F 17/30551 707/694 |

(Continued)

OTHER PUBLICATIONS

Melnik et al., Dremel: Interactive Analysis of Web-Scale Datasets, 36th International Conference on Very Large Data Bases, published 2010, pp. 330-339.*

(Continued)

*Primary Examiner* — Jeff A Burke
(74) *Attorney, Agent, or Firm* — Schwegman Lundberg & Woessner, P.A.

(57) ABSTRACT

A distributed database of time stamped records can be used to store time series data such as events occurring on the Internet. A distributed database of time stamped records can store segments of data that contain events for different time intervals. The volume of events occurring on the Internet introduces a "Big Data" variable that makes collections of data sets so large and complex they are difficult to manage. Disclosed are systems and methods to manage segments of a distributed database of time stamped records for optimal size (for storage and performance reasons etc.) and for proper visibility to data when different segments contain data for overlapping time periods.

15 Claims, 9 Drawing Sheets

(56) References Cited

U.S. PATENT DOCUMENTS

| | | | | |
|---|---|---|---|---|
| 2013/0103657 | A1* | 4/2013 | Ikawa | G06F 17/30985 707/693 |
| 2014/0078163 | A1* | 3/2014 | Cammert | G06F 11/3471 345/589 |
| 2014/0101093 | A1* | 4/2014 | Lanphear | G06F 17/30563 707/602 |
| 2014/0122022 | A1* | 5/2014 | Chen | G06F 3/06 702/181 |
| 2014/0279824 | A1* | 9/2014 | Tamayo | G06F 17/30572 707/600 |
| 2014/0279927 | A1* | 9/2014 | Constantinescu | G06F 17/30156 707/679 |
| 2014/0280032 | A1* | 9/2014 | Kornacker | G06F 17/30442 707/718 |
| 2015/0120749 | A1* | 4/2015 | Phanishayee | G06F 17/30321 707/741 |
| 2015/0186434 | A1* | 7/2015 | Eichinger | G06F 17/30551 707/693 |
| 2015/0379050 | A1* | 12/2015 | Yanacek | G06F 17/30292 707/736 |
| 2015/0379065 | A1* | 12/2015 | Yoshizawa | G06F 17/30309 707/689 |
| 2016/0253381 | A1* | 9/2016 | Kim | G06F 17/30516 |
| 2017/0220938 | A1* | 8/2017 | Sainani | G06N 5/04 |

OTHER PUBLICATIONS

Han and Stoulia, A Three-Dimensional Data Model for HBase for Large Time-Series Dataset Analysis, 2012 IEEE 6th International Workshop on the Maintenance and Evolution of Service-Oriented and Cloud-Based Systems, publsihed 2012, pp. 47-56.*

Tschetter, Eric, Scaling the Druid Data Store, published Jan. 12, 2012, retreived at http://druid.io/blog/2012/01/19/scalingthedruid-datastore.html, pp 1-8.*

Yang et al., DRUID: A Real-Time Analytical Data Store, SIGMOD'14, published Jun. 27, 2014.*

Tschetter, Eric, Introducing Druid: Real-Time Analytics at a Billion Rows Per Second, published Apr. 30, 2011.*

Cipar et al., LazyBase: Trading Freshness for Performance in a Scalable Database, EuroSys '12, published Apr. 13, 2012.*

Wikipedia, Unique Identifiers (Year: 2018).*

"Initial commit of OSS Druid Code", druid-io/druid@9d41599 • GitHub, (accessed Mar. 27, 2018), 174 pgs.

Tschetter, Eric, "Druid, Part Deux: Three Principles for Fast, Distributed OLAP", (May 20, 2011), 4 pgs.

Tschetter, Eric, "Introducing Druid: Real-Time Analytics at a Billion Rows Per Second", (Apr. 30, 2011), 8 pgs.

Tschetter, Eric, "Scaling the Druid Data Store", (Jan. 19, 2012), 7 pgs.

Yang, Fangjin, "Fast, Cheap, and 98% Right: Cardinality Estimation for Big Data", (May 4, 2012), 5 pgs.

* cited by examiner

SEGMENT DATA VISIBILITY AND MANAGEMENT IN A DISTRIBUTED DATABASE OF TIME STAMPED RECORDS

CROSS-REFERENCE TO RELATED APPLICATIONS

The present application claims the benefit of U.S. Provisional Application No. 61/858,876, filed Jul. 26, 2013, and U.S. Provisional Application No. 61/914,126, filed Dec. 10, 2013. The contents of the above named applications are incorporated herein by reference.

TECHNICAL FIELD

This disclosure relates generally to a system and method for managing segments of a distributed database of time stamped records (referred to as "Druid" in some disclosed embodiments). Each segment stores data for an associated time interval relative to the collected data. Time intervals for each segment can span a different duration of time. Methods and systems are disclosed to maintain proper visibility of data in each segment (different segments can overlap relative to time) and to maintain proper segment size relative to volume of data for different time durations. Methods and systems are also disclosed to maintain proper distribution of load based on hardware and configuration rules.

BACKGROUND

In the current information age there are various forms of databases used to store data. Different types of databases employ different data storage models. Depending on the type of data collected and access requirements of stored data, a designer may select an appropriate database type and implementation design. The implementation design addresses concerns regarding whether or not the database is distributed, internal tuning parameters of a database, redundancy of data storage, and hardware specifications for the infrastructure supporting the database, etc.

A relational database typically allows for the definition of data structures, storage and retrieval operations and integrity constraints. In a relational database the data and relations between them are organized in tables. A table is a collection of rows or records and each row in a table contains the same fields. Certain fields may be designated as keys, which means that searches for specific values of that field can use indexing to speed them up. Where fields in two different tables take values from the same set, a join operation can be performed to select related records in the two tables by matching values in those fields. Often, but not always, the fields will have the same name in both tables. For example, an "orders" table night contain (customer_id, product_code) pairs and a "products" table might contain (product_code, price) pairs so to calculate a given customer's bill you would sum the prices of all products ordered by that customer by joining on the product-code fields of the two tables. This can be extended to joining multiple tables on multiple fields. Because these relationships are only specified at retrieval time, relational databases are classed as dynamic database management system.

A time series database (regular) is a software system that is optimized for handling time series data, arrays of numbers indexed by time (a date time or a date time range). In a regular time series database a sequence of data points are measured at successive points in time and spaced at uniform time intervals. In a slightly different data model an "irregular" time series database allows for time series data to be collected over time at non-uniform time intervals.

With the advent of Big Data, problems faced by database designers have become even more complex. Big Data storage requirements are on a magnitude not contemplated by traditional database architectures. Disclosed herein are systems and methods to increase performance and maintain proper visibility into a distributed database of time stamped records, particularly when utilized to store Big Data quantities of event records as events occur on the Internet.

DETAILED DESCRIPTION

Figure 1:
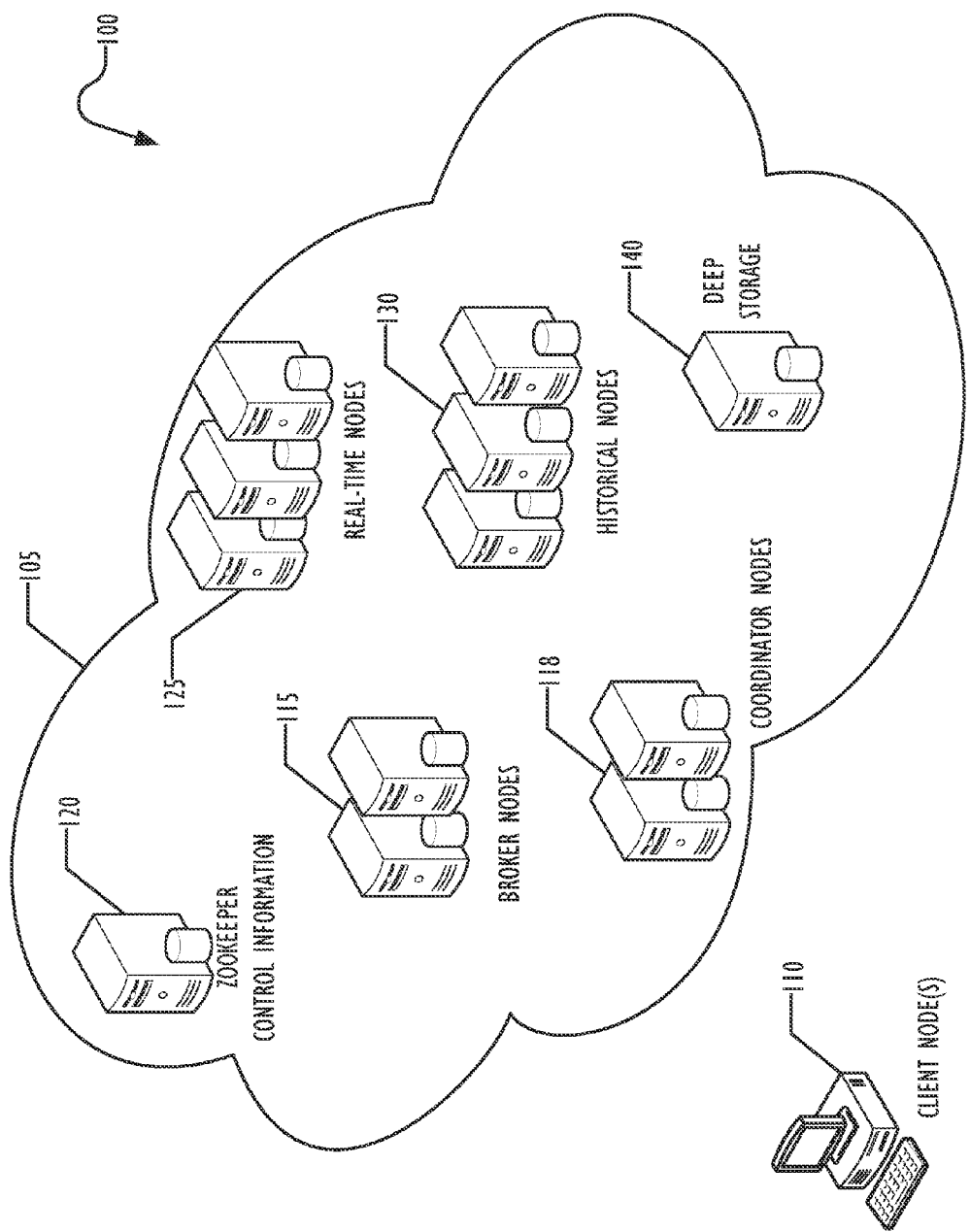
FIG. 1 illustrates architecture 100 for one embodiment of a distributed database of time stamped records which could be utilized to support concepts of this disclosure.

Referring to FIG. 1, architecture 100 illustrates resources to provide infrastructure for a distributed database of time stamped records according to one or more disclosed embodiments. Cloud 105 represents a logical construct containing a plurality of machines configured to perform different roles in a support infrastructure for the distributed database of time stamped records. Cloud 105 is connected to one or more client nodes 110 which interact with the resources of cloud 105 via a network connection (not shown). The network connection can be wired or wireless and implemented utilizing any kind of computer networking technique. Internal to cloud 105 are various servers and storage devices (e.g., control information 120, broker nodes 115, coordinator nodes 118, real-time nodes 125, historical nodes 130, and deep storage 140) configured to perform individually distinct roles when utilized to implement management of the database of time stamped records. Each of the computers within cloud 105 can also be configured with network connections to each other via wired or wireless connections as required. Typically, all computers are capable of communicating with all other computers however, based on their role each computer may not have to communicate directly with every other computer. The terms computer and node are used interchangeably throughout the context of this disclosure. Additionally references to a single computer could be implemented via a plurality of computers performing a single role or a plurality of computers each individually performing the role of the referenced single computer (and vice versa). Also, each of the computers shown in cloud 105 could be separate physical computers or virtual systems implemented on non-dedicated hardware resources.

Broker nodes 115 can be used to assist with external visibility and internal coordination of the disclosed database of time stamped records. In one embodiment, client node(s) 110 interact only with broker nodes (relative to elements shown in architecture 100) via a graphical user interface (GUI). Of course, a client node 110 may interact directly with a web server node (not shown) that in turn interacts with the broker node. However, for simplicity of this disclosure it can be assumed that client node(s) 110 interact directly with broker nodes 115. Broker nodes 115 receive query requests (i.e., requests for specifically qualified sets of data similar to but not identical to a query to other types of databases) from clients. Broker nodes 115 then interact with "zookeeper" control information node 120 to determine exactly where the data is stored that is responsive to the query request. It may also be possible to interact with a "cached view" of the control information without having to interact with control information node 120. Data can be stored in one or more of real-time nodes 125, historical nodes 130, and/or deep storage 140. The zookeeper control information is used to inform the broker node of which nodes have announced that they serving a segment of data (explained below) and also to determine which segments of data are required to satisfy a given query. The broker node can use the information from zookeeper node 120 to build a timeline view (explained below) into blocks of data (explained below) that logically (and possibly physically) contain the segments required for a response to the query.

Real-time nodes 125 collect and store data (e.g., Internet events) for an interval of time that is currently (or was recently) being collected. Intervals for real-time nodes 125 can be current hour or current day for example. Real-time nodes 125 can then persist the collected data by transferring the data to one or more historical nodes 130 at the end of each interval (or at a time after the interval has ended). The amount of time to wait after a given interval to persist the data can be configurable and allows for data that is slow to arrive (e.g., has a time stamp that belongs to a non-current interval) to be properly stored along with the rest of the data belonging to the same interval (e.g., previously completed interval). Historical nodes 130 store data in segments of data. Each segment of data represents an interval (i.e., contiguous time range) of data from a data source and has a unique version relative to other segments in the system with the exception that all segments within a given Block have the same version and that version is also the version of the Block itself (a single segment/version is not shared across multiple Blocks). Segments of data are explained further below and are distributed across historical nodes in a manner to allow efficient future access. Segments of data that have not been accessed in a large amount of time or are not expected to be accessed in the near future can be further archived into deep storage node(s) 140. One example of a data base of time stamped records is discussed in the white paper entitled: "Druid: A Real-time Analytical Data Store," which is hereby incorporated by reference.

It should be noted that the disclosed database of time stamped records is not a relational database nor is it a traditional regular or irregular time series database. Data stored in the disclosed database of time stamped records can represent events on the Internet and thus may be utilized to facilitate storage and interaction with Big Data scale repositories. Of course, the disclosed techniques are applicable to a database that does not store Big Data type volumes but the disclosed timeline view and merging of segments have been found to be particularly useful when dealing with Big Data scenarios.

Figure 2:
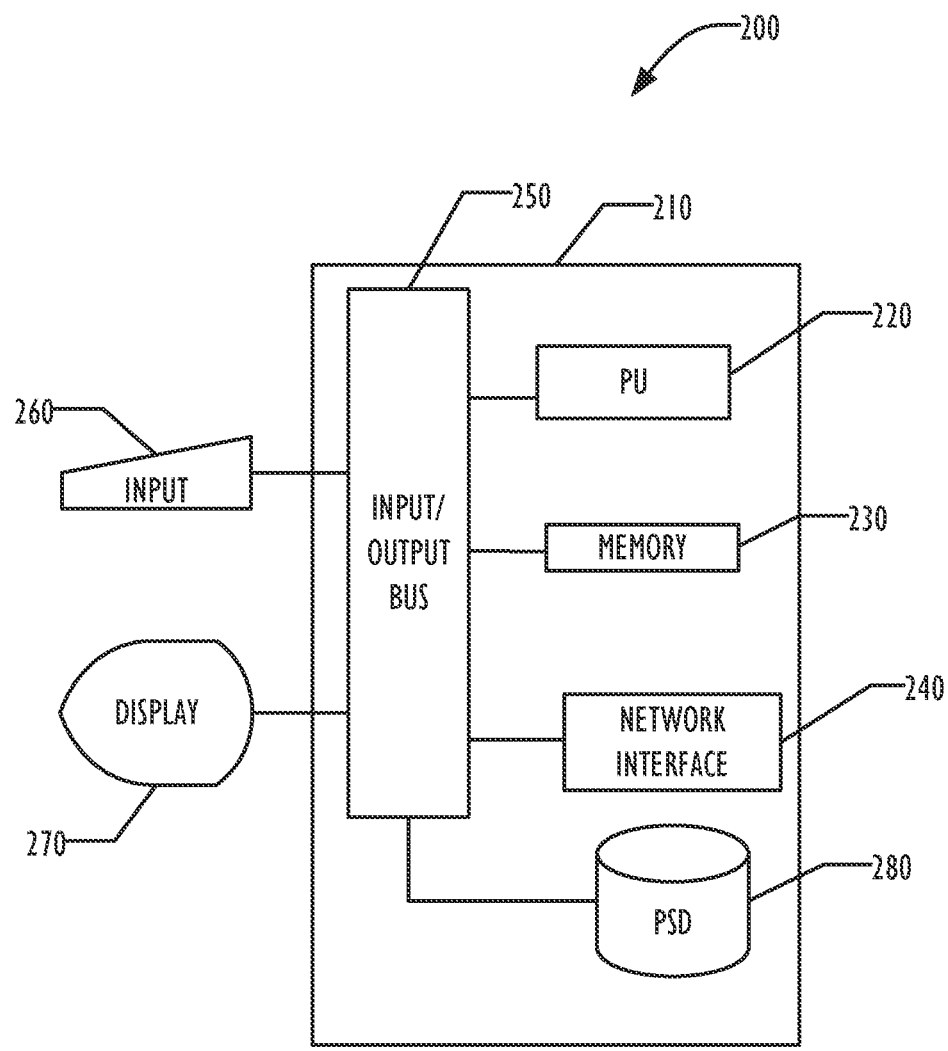
FIG. 2 is a block diagram 200 illustrating a computer with a processing unit which could be configured to facilitate one or more functional components according to one or more disclosed embodiments.

Referring now to FIG. 2, an example processing device 200 for use in providing disclosed detection techniques according to one embodiment is illustrated in block diagram form. Processing device 200 may serve as processor in a gateway or router, client computer 110, or a server computer (e.g., 115, 120, 125, 130 or 140). Example processing device 200 comprises a system unit 210 which may be optionally connected to an input device for system 260 (e.g., keyboard, mouse, touch screen, etc.) and display 270. A program storage device (PSD) 280 (sometimes referred to as a hard disc, flash memory, or computer readable medium) is included with the system unit 210. Also included with system unit 210 is a network interface 240 for communication via a network (either wired or wireless) with other computing and corporate infrastructure devices (not shown). Network interface 240 may be included within system unit 210 or be external to system unit 210. In either case, system unit 210 will be communicatively coupled to network interface 240. Program storage device 280 represents any form of non-volatile storage including, but not limited to, all forms of optical and magnetic memory, including solid-state, storage elements, including removable media, and may be included within system unit 210 or be external to system unit 210. Program storage device 280 may be used for storage of software to control system unit 210, data for use by the processing device 200, or both.

System unit 210 may be programmed to perform methods in accordance with this disclosure. System unit 210 comprises one or more processing units (represented by PU 220), input-output (I/O) bus 250, and memory 230. Memory access to memory 230 can be accomplished using the communication bus 250. Processing unit 220 may include any programmable controller device including, for example, a mainframe processor, a cellular phone processor, or one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Company. ARM is a registered trademark of the ARM Limited Company). Memory 230 may include one or more memory modules and comprise random access memory (RAM), read only memory (ROM), programmable read only memory (PROM), programmable read-write memory, and solid-state memory. PU 220 may also include some internal memory including, for example, cache memory or memory dedicated to a particular processing unit and isolated from other processing units for use in maintaining monitoring information for use with disclosed embodiments of rootkit detection.

Processing device 200 may have resident thereon any desired operating system. Embodiments of disclosed detection techniques may be implemented using any desired programming language, and may be implemented as one or more executable programs, which may link to external libraries of executable routines that may be supplied by the provider of the detection software/firmware, the provider of the operating system, or any other desired provider of suitable library routines. As used herein, the term "a computer system" can refer to a single computer or a plurality of computers working together to perform the function described as being performed on or by a computer system.

In preparation for performing disclosed embodiments on processing device 200, program instructions to configure processing device 200 to perform disclosed embodiments may be provided stored on any type of non-transitory computer-readable media, or may be downloaded from a server onto program storage device 280. It is important to note that even though PU 220 is shown on a single processing device 200 it is envisioned and may be desirable to have more than one processing device 200 in a device configured according to disclosed embodiments.

Figure 3:
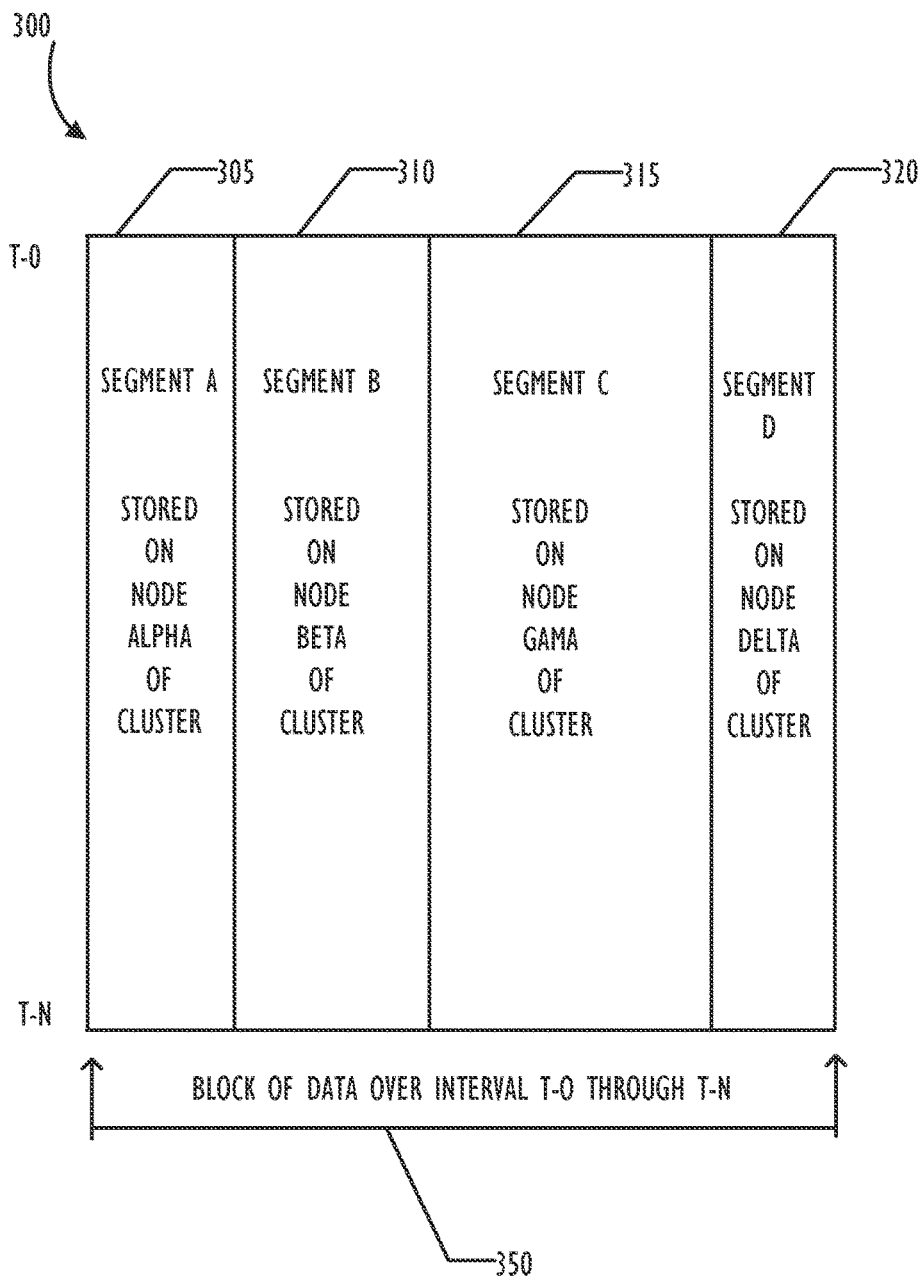
FIG. 3 is a block diagram 300 illustrating an embodiment of a data storage model (e.g., logical "Block" of data) which could be used to implement one or more disclosed embodiments.

Referring now to FIG. 3, block diagram 300 illustrates a logical embodiment of a data "Block" which could be used to implement the one or more disclosed embodiments. Block 350 represents a "Block" of data from a data source collected over a time interval (e.g., T-0 through T-N). Block 350 contains data from four different segments represented as segment A, B, C and D. Segment A 305 in this example is stored on node alpha of a cluster such as that shown inside cloud 105 of FIG. 1. Segment B 310 in this example is stored on node beta, segment C 315 on node gamma, and segment D 320 on node delta. Each of the segments store data for the same time interval as Block 305 and allow Block 305 to represent a logical container for the data coming from the different segments on different nodes. If Block 350 represents a block of real-time data then each of nodes alpha, beta, gamma and delta are real-time nodes 125. Alternatively, if Block 350 represents a block of historical data then each of nodes alpha, beta, gamma and delta are historical nodes 125. Each of the segments making up block 350 may have different amounts of physical storage requirements. If Block 350 (or any segment thereof) is being reloaded from deep storage 140 then Block 350 will not be made available to service query requests. If all the segments required for Block 350 are available across some configuration of nodes in the cluster then Block 350 is considered complete. Otherwise Block 350 is considered incomplete. Incomplete blocks are not made available to service query requests.

Figure 4:
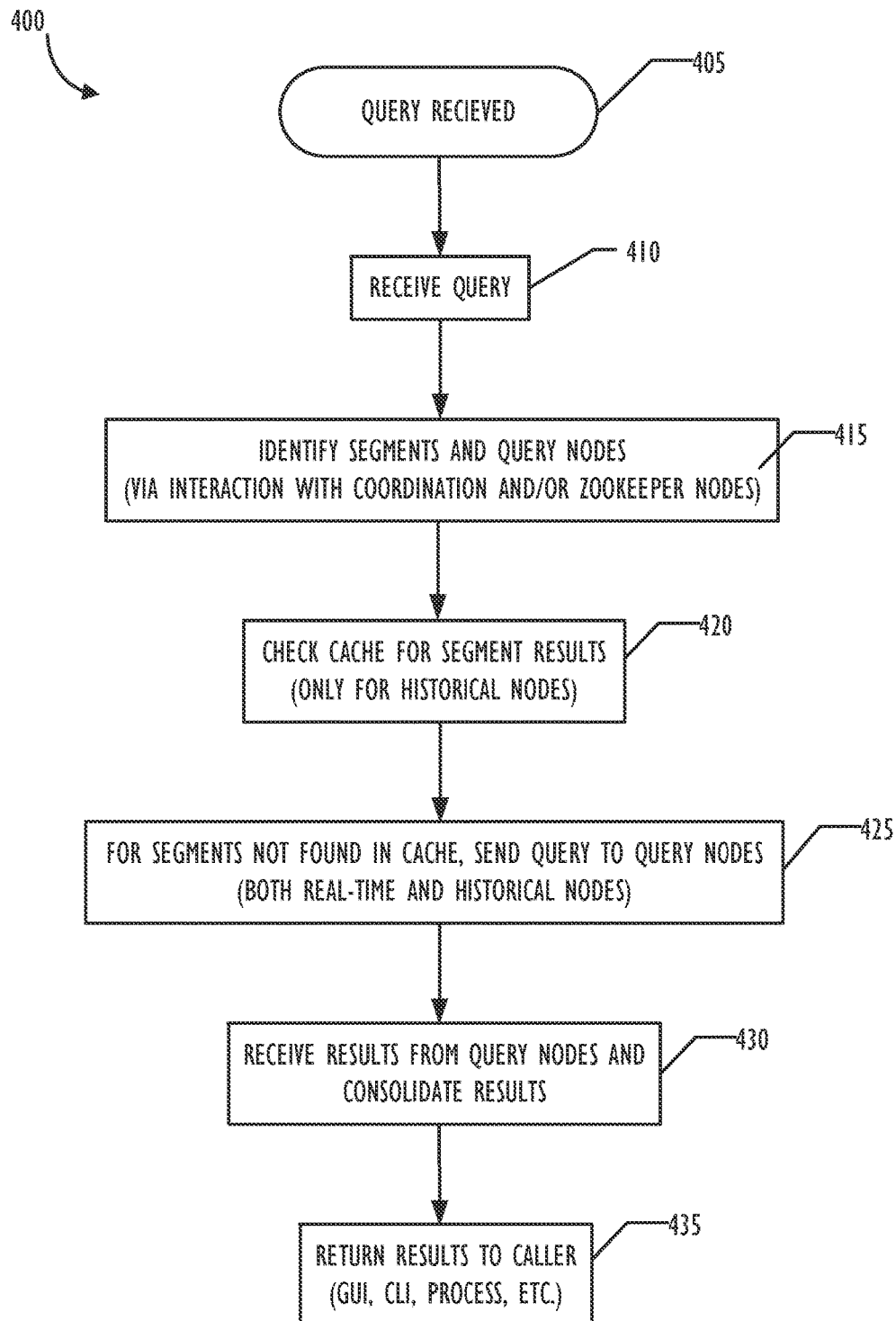
FIG. 4 illustrates a flowchart 400 for a possible query input to a database of time stamped records and resulting retrieval of data utilizing the timeline view structure according to one or more disclosed embodiments.

FIG. 4 illustrates a flowchart 400 representing a possible flow to respond to a query 405 received at a broker node 115 to interact with a cluster (e.g., cloud 105) storing a distributed database of time stamped records utilizing a timeline view structure (explained below FIGS. 5 and 6) according to one or more disclosed embodiments. Initially, the query is received at the broker node as shown in block 410. The query identifies dimensions, metrics and a time range for which to return data. The query can also contain other directives which would be understood by one of ordinary skill in the art of database technology. Dimensions represent columns of "annotation" data that can be used to subdivide the data. Dimensions are columns primarily used to either (a) filter or (b) group the data and are not aggregated over. Metrics are columns of (generally numerical) "fact" data that can be used in aggregation functions. An example query could be of the form, "SELECT dimension, count(*) AS cnt, sum(metric1), sum(metric2), sum(metric3), sum(metric4) FROM_table_WHERE timestamp>=T-0 AND timestamp<=T-N GROUP BY dimension ORDER BY cnt limit 100."

Next, broker node 115 interacts with zookeeper control node 120 to identify which segments store the underlying data from the data source for the time range (i.e., interval) between T-0 and T-N. Broker node 115 can utilize the timeline data structure (FIG. 6) to identify query nodes (e.g., real-time nodes and/or historical nodes) required to return appropriate data for the requested interval (block 415). Broker node 115 can optionally check a cache for segment results related to historical nodes that have been identified. Note that cache should only be supported for historical nodes because data in real-time nodes can be changing and the data stored in a cache may not be accurate. Historical nodes contain read-only data for each segment they publish and make available for query; therefore, the cached data is guaranteed to be accurate. If ever a segment is updated, a new segment is created and information about this new segment is relayed to zookeeper. In turn, a new Block can be created and made available for subsequent query (as explained in more detail below FIGS. 7 and 8). Next, for data not available in cache a request is sent (block 425) to appropriate query nodes for data required to form a response to the query being processed. Each query node is agnostic to activities of other query nodes and returns its requested information to broker node 115. At block 430, broker node 115 can gather and consolidate results from the query nodes and any results obtained from cache. Finally at block 435, broker node 115 can return a result to the query response to whatever caller initiated the query request. Query requests, in a non-limiting example, can be initiated by users using a GUI, from a command line interface (CLI) or from another process executing on a computer connected to cloud 105.

Figure 5:
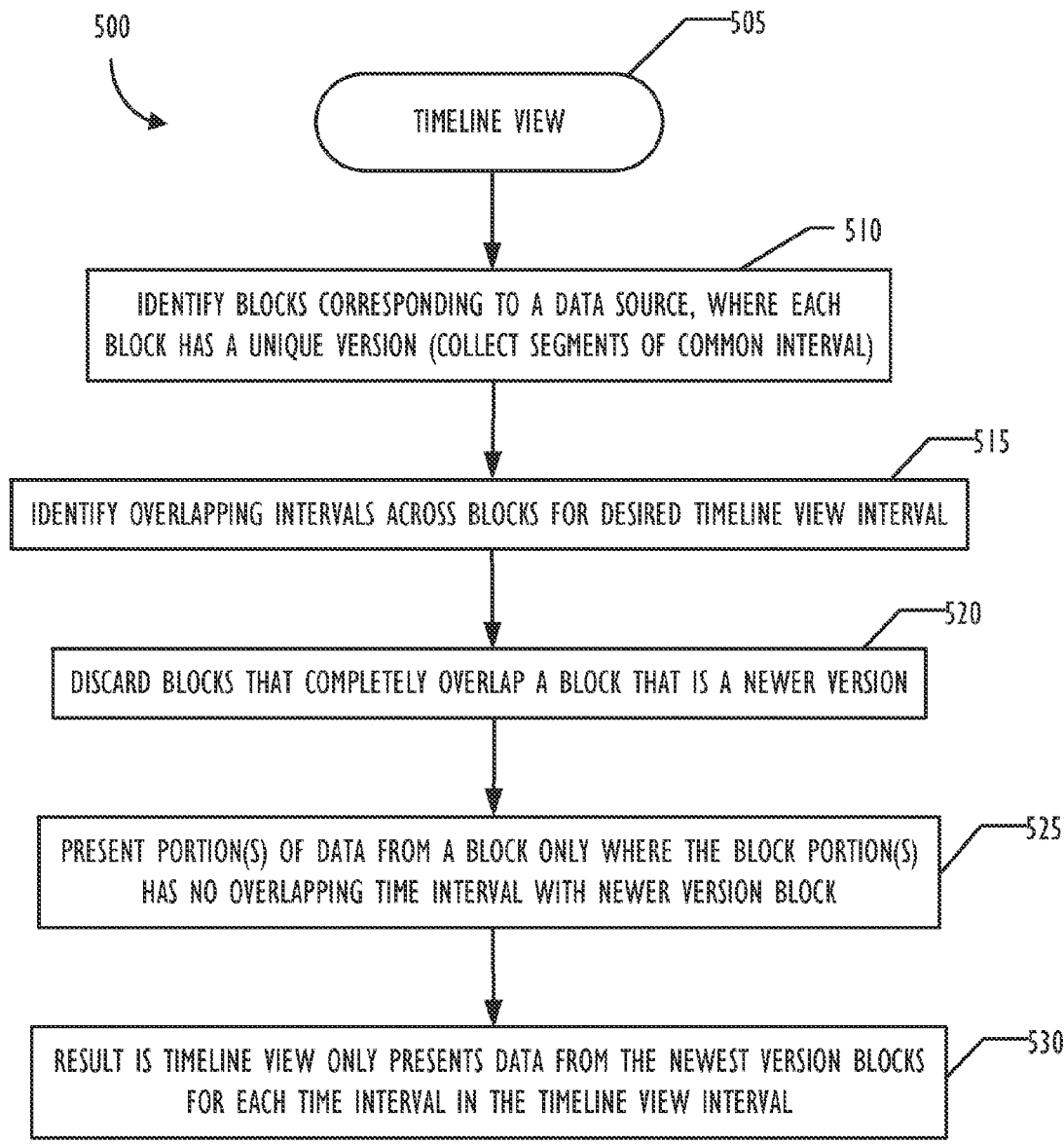
FIG. 5 illustrates a flowchart 500 for creation/maintenance of a timeline view structure to assist with proper visibility into a distributed database of time stamped records collected into storage segments according to one or more disclosed embodiments.
Figure 6:
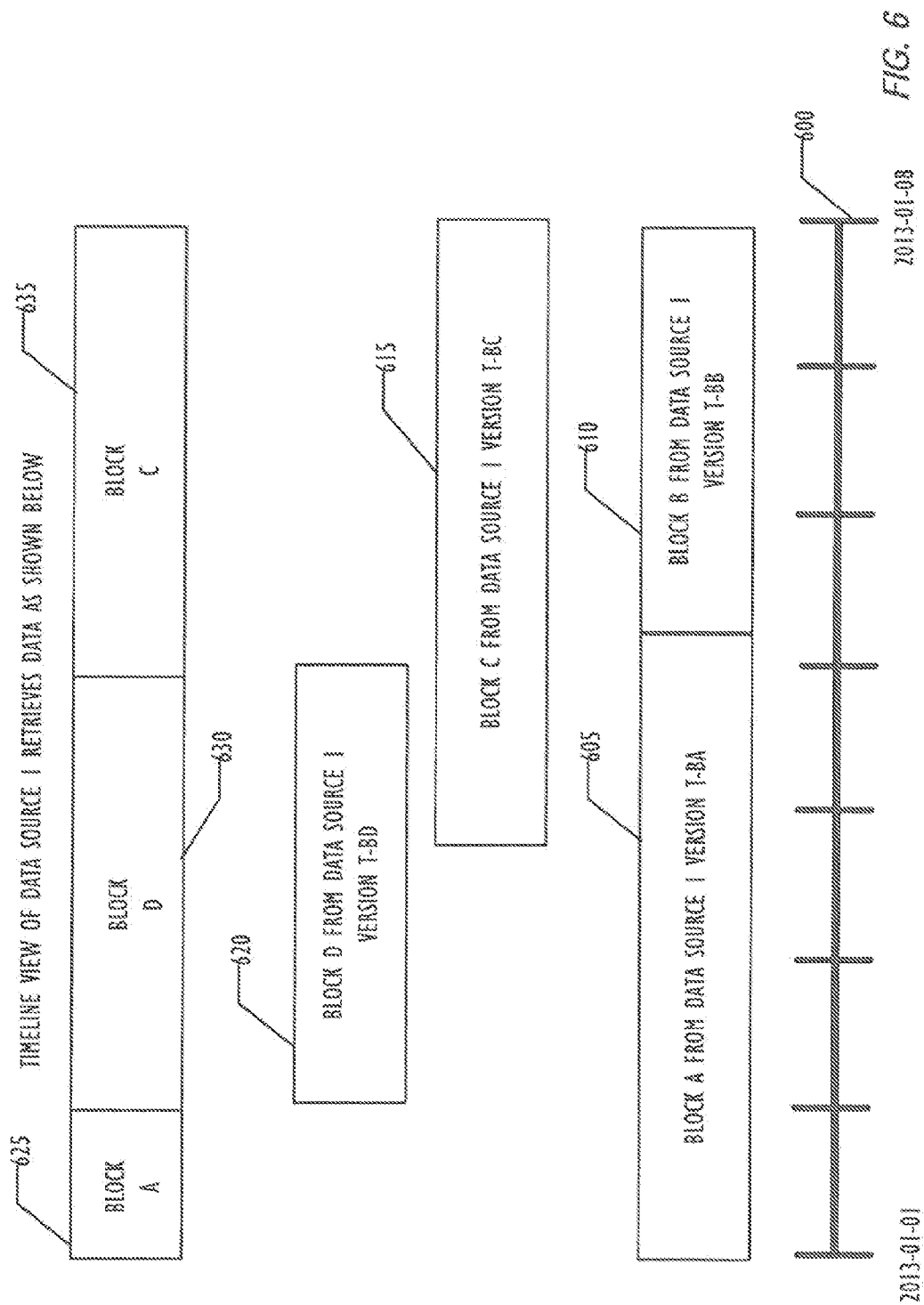
FIG. 6 is a diagram illustrating a timeline view into data stored in a distributed database of time stamped records according to disclosed techniques and the data storage model of FIG. 3.

Referring now to FIGS. 5 and 6, FIG. 5 illustrates flowchart 500 for creation/maintenance of a timeline view structure to assist with proper visibility into a distributed database of time stamped records collected into storage segments according to one or more disclosed embodiments and FIG. 6 illustrates a timeline view into data stored in a distributed database of time stamped records according to disclosed techniques and the data storage model of FIG. 3 and flowchart 500.

Flow chart 500 begins at element 505 to determine a timeline view of data stored in blocks and their corresponding segments of a distributed database of time stamped records. In element 510, blocks corresponding to a data source are identified. As explained above with respect to FIG. 3, blocks contain one or more segments grouped together for a given interval. When responding to a query it is important to provide the "freshest" data. Freshness of data does not necessarily refer to when the underlying data was collected (i.e., its timestamp) because data can be updated by creating a new segment that replaces a previous segment for a given data source and interval. A new segment can be created if updated data (i.e., corrected data) is provided after it has been collected, if segments are merged (as described below), or if data collection was restarted at a larger time granularity of with a different set of dimensions. Recall that segments are read-only once they are no longer real-time segments so an update can only happen if a new segment at a new version is created to replace the "old" segment. At element 515, blocks for the requested timeline view interval (e.g., query interval) are identified and overlapping portions of each block interval are identified. A Block interval that is completely "covered" by a higher version (i.e., fresher) block are not used (element 520). In an embodiment, blocks that are completely overlapped by one or more blocks having newer versions are discarded from the timeline. Data from a lower version block are only made available in the timeline view when there is no overlap with any block of a higher (newer) version from the same data source (element 525). Flow continues to progress through higher version blocks from the same data source to select portions of intervals of blocks that have no overlap with any higher version block. At element 530, the result is a timeline view that only presents data from the highest (newest) version block that contains data for that portion of the interval for the data source.

FIG. 6 illustrates an example of the flowchart 500. Element 600 represents an interval of 8 days of a desired timeline view beginning on Jan. 1, 2013 and ending on Jan. 8, 2013. Element 605 represents Block A from data source 1 and a version T-BA (the version "T-BA" represents the time that Block A was initially created or a sequenced identifier indicating the order it was created in relative to other blocks and/or segments). Block A 605 contains data from Jan. 1, 2013 through some time in the day of Jan. 5, 2013. Block B (element 610) represents a neighboring Block to Block A and contains data from the remaining portion of day Jan. 5, 2013 through to Jan. 8, 2013. In a similar manner to Block A, Block B has a version T-BB that represents a unique identifier to indicate how "fresh" Block B is relative to other Blocks and/or segments in the cluster maintaining the distributed database of time stamped records. Block C (element 615) represents an updated Block relative to Block A and B and has an overlapping interval with each of these Blocks. Similarly, Block D (element 620) represents an updated Block relative to Blocks A, B and C and has an overlapping interval with Blocks A and C. As a result the corresponding timeline view relative to these four Blocks is represented by element 625 pulling data from Block A, element 630 pulling data from Block D, and element 635 pulling data from Block C. No data is pulled from Block B because for the given timeline interval all of the data in Block B is covered by data available in Block C.

Figure 7:
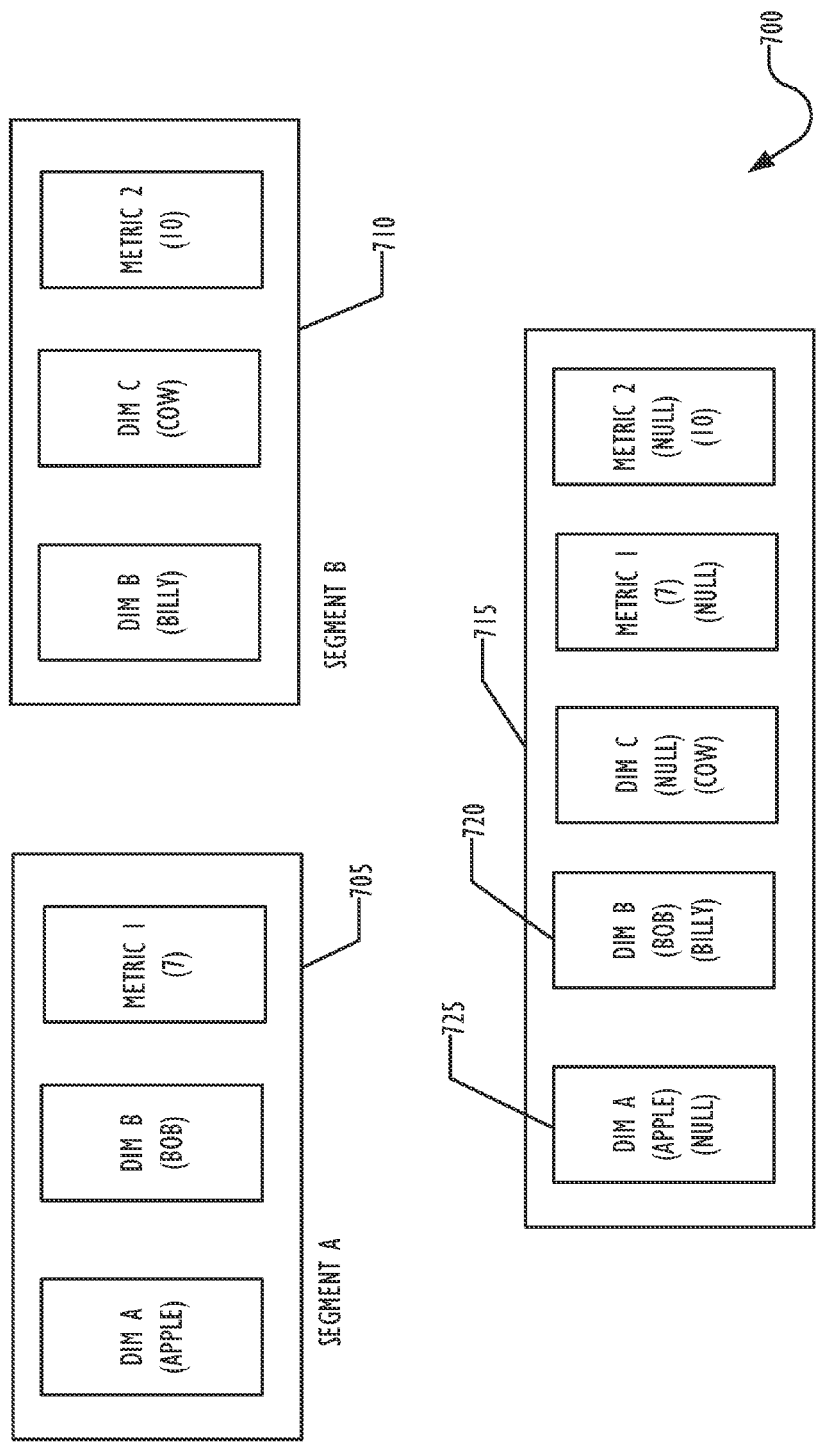
FIG. 7 illustrates a block diagram showing how data from two different segments could be represented within a merged segment according to one or more disclosed embodiments.
Figure 8:
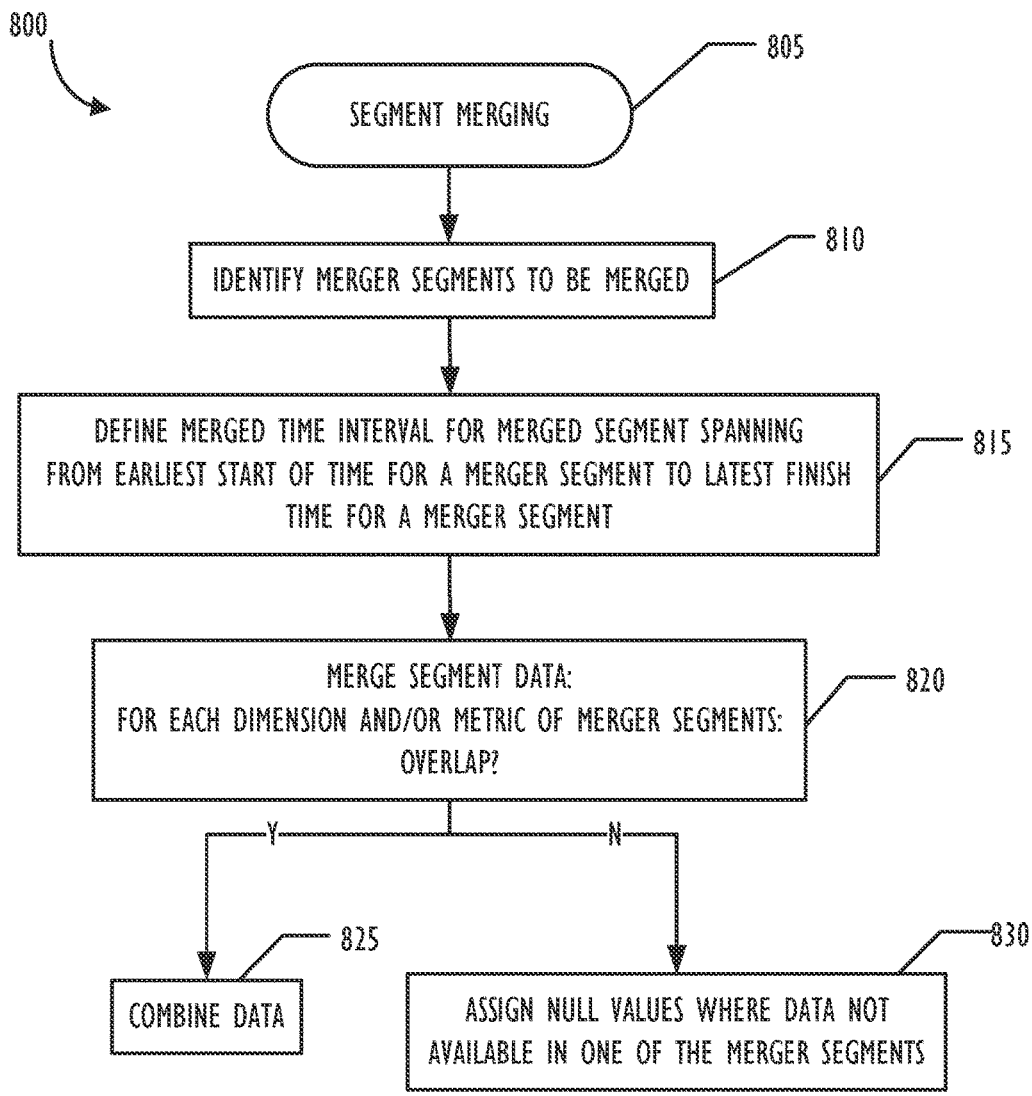
FIG. 8 illustrates a flowchart 800 for one method of merging segments of data stored in a database of time stamped records according to one or more disclosed embodiments.

Referring now to FIGS. 7 and 8, a diagram 700 and flow chart 800 illustrate how data from two different segments could be represented in a merged segment, according to an embodiment of the invention. Segment A (705) contains two dimensions (A and B) and one metric (1) each containing a collected value as shown. Segment B (710) contains two dimensions (B and C) and one metric (2). When merging segments that contain overlapping and non-overlapping dimensions and metrics a null value is used for data that is not available in one of the segments. As shown in merged segment 715, dimension A was only available in segment A and thus has a value of "Apple" corresponding to segment A and a "null" value representing that this dimension was not available in segment B. As shown in element 720, dimension B was available in both segment A and segment B therefore it maintains its two corresponding values in the merged segment 715. Each of the other dimensions (C) and metrics (1 and 2) are similarly "merged" as shown in merged segment 715.

Flowchart 800 illustrates an example method of creating the merged segment shown in merged segment 715. Segment merging (805) is initiated to maintain a proper balance of segment size and distribution throughout a cluster maintaining a distributed database of time stamped records. Recall that different segments can be distributed to different nodes throughout the cluster and therefore a distribution that is more optimal can be attempted (actual 100% optimization may not be practical). At element 810, segments are identified that can be merged. The identification can take into account performance capacities of nodes in a cluster and in related fashion the size of the actual segments that are to be merged. In general there is a tradeoff between managing a cluster of very few and very large segments versus a cluster of very many small segments. A moderate number of segments (relative to the total possible number of segments) each of roughly equal size may allow the cluster to function more efficiently. At a high level, fewer segments can make the cluster easier to manage.

Next, identified segments are merged. The time interval and data of a merged segment are determined by the time intervals and data of each component merger segment. In element 815, a merged time interval is defined for the merger segment. In an embodiment, the merged time interval spans from the earliest start time for a merger segment to the latest finish time for a merger segment. Neighboring segments that have collection intervals that are sequential to each other can be considered good candidates for merger to cover the concatenated interval. Segments that are not direct neighbors can be merged however the merger interval will span from the earliest timestamp of either segment to the latest timestamp of either segment and can result in a data loss for time periods not contained in both segments. In element 820, merger segment data is merged. As explained in FIG. 7, data overlapping between at least two merger segments is combined (element 825). Data not available in both segments either because of timestamp or because of dimension/metric collection will result in a corresponding null value in a merged segment (element 830).

Each segment that is created through merging (or created any other way) has a new and unique version that identifies the segment and indicates its "freshness" as described above. The merger process need not occur in the sequence shown by flowchart 500. For example, data may be merged prior to definition of the merger time interval. Furthermore, although described here as merging two segments, any number of segments could be simultaneously merged to create a new larger segment.

As explained above, management of a cluster maintaining a distributed database of time stamped records can present difficulties both in optimizing segment size and providing proper visibility into collected data. This can be caused by the volume of data, the highly distributed and scaleable nature of the cluster, and by changes to historical data. Using the disclosed techniques of segment merging and a timeline view into data segments via Blocks can help to address these issues.

Broker and Segment Loading

The broker node(s) (115 of FIG. 1) can receive queries in order to run a distributed cluster. The broker node understands the metadata published to Zookeeper (120) about what segments exist on what nodes and routes queries such that they hit the right nodes. The "right" nodes comprise those nodes that properly match a segment loading rule as explained further here. The broker node can also merge any resulting sets from all of the individual nodes providing information responsive to a particular query together. As explained above, any real-time nodes (125) announce themselves and the segments they are serving in Zookeeper (120). Examples of configuration information and property/description information are provided in Appendix A below.

With respect to "forwarding queries," most Druid queries can contain an interval object that indicates a span of time for which data is requested. Likewise and as explained in more detail above, Druid segments are partitioned to contain data for some interval of time (from a particular data source)

and segments are distributed across a cluster. Consider a simple data source with 7 segments where each segment contains data for a given day of the week. Any query issued to the data source for more than one day of data will hit more than one segment. These segments will likely be distributed across multiple nodes, and hence, the query will likely hit multiple nodes.

To determine which nodes to forward queries to, the broker node first builds a view of the world from information in Zookeeper. Zookeeper maintains information about historical and real-time nodes and the segments each respective node is currently serving (e.g., which nodes have loaded that segment). For every data source defined in Zookeeper, the broker node builds a timeline of segments (described in detail above) and the nodes that serve them. When queries are received for a specific data source and interval, the broker node performs a lookup into the timeline associated with the query data source for the query interval and retrieves the nodes that contain data for the query. The broker node then forwards down the query to the selected nodes.

Broker nodes can employ a cache; possibly with cache invalidation strategy (for example with a least recently used (LRU)). The broker cache can store per segment results. The cache can be local to each broker node or shared across multiple nodes using an external distributed cache such as memcached. Each time a broker node receives a query, it first maps the query to a set of segments. A subset of these segment results may already exist in the cache and the results can be directly pulled from the cache (e.g., without forwarding to the historical node(s)). For any segment results that do not exist in the cache, the broker node can forward the query to the historical nodes as necessary. Once the historical nodes return their results, the broker can store those results in the cache. In this example embodiment, real-time segments are never cached and hence requests for real-time data will always be forwarded to real-time nodes. Real-time data is perpetually changing and caching the results could be unreliable.

Coordinator

The Druid coordinator node(s) (118 of FIG. 1) are primarily responsible for segment management and distribution. More specifically, the Druid coordinator 118 communicates to historical nodes to load or drop segments based on configurations and rules as described herein. The Druid coordinator is responsible for loading new segments, dropping outdated segments, managing segment replication, and balancing segment load (and possibly other functions as needed). Cost considerations can be taken into account with rule configuration such that coordinator 118 distributes and manages segments in a cost effective manner. For example, "hot" segments can be served on higher tier equipment with more processing power and memory than "cold" segments. In this example hot segments refer to segments that are newer or accessed more often by active queries and cold segments can refer to older or less frequently accessed data.

The Druid coordinator (in some embodiments) runs periodically and the time between each run is a configurable parameter. Each time the Druid coordinator runs, it can assess the current state of the cluster before deciding on the appropriate actions to take. Similar to the broker and historical nodes, the Druid coordinator can maintain a connection to a Zookeeper cluster for current cluster information. The coordinator can also maintain a connection to a database containing information about available segments and rules. Available segments can be stored in a segment table and list all segments that should be loaded in the cluster. Rules can be stored in a rule table and can indicate how segments should be handled.

Before any unassigned segments are serviced by historical nodes, the available historical nodes for each tier can be first sorted in terms of capacity, with least capacity servers having the highest priority. In one embodiment, unassigned segments are always assigned to the nodes with least capacity to maintain a level of balance between nodes. The coordinator does not directly communicate with a Historical node when assigning it a new segment; instead the coordinator creates some temporary information about the new segment under load queue path of the historical node. Once this request is seen, the historical node will load the segment and begin servicing it. Appendix B contains more information about the coordinator and its possible configuration capabilities.

Rule-Configuration

Load rules can indicate how many replicants of a segment should exist in a server tier. The interval of a segment will be compared against the specified period. The rule matches if the period overlaps the interval.

Interval Load Rule according to one example embodiment. Interval Load Rules are of the Form:

```
{
    "type" : "loadByInterval",
    "interval" : "2012-01-01/2013-01-01",
    "tier" : "hot"
}
``` type—this should always be "loadByInterval"
interval—A JSON Object representing ISO-8601 Intervals
tier—the configured historical node tier Period Load Rule according to one example embodiment. Period Load Rules are of the Form:

```
{
    "type" : "loadByPeriod",
    "period" : "P1M",
    "tier" : "hot"
}
``` type—this should always be "loadByPeriod"
period—A JSON Object representing ISO-8601 Periods
tier—the configured historical node tier Drop rules can indicate when segments should be dropped from the cluster. The interval of a segment will be compared against the specified period. The period is from some time in the past to the current time. The rule matches if the period contains the interval.

Interval Drop Rule according to one example embodiment. Interval Drop Rules are of the Form:

```
{
    "type" : "dropByInterval",
    "interval" : "2012-01-01/2013-01-01"
}
``` type—this should always be "dropByInterval"
interval—A JSON Object representing ISO-8601 Periods A segment is dropped if the interval contains the interval of the segment.

Period Drop Rule according to one example embodiment. Period Drop Rules are of the Form:

```
{
    "type" : "dropByPeriod",
    "period" : "P1M"
}
```

1. type—this should always be "dropByPeriod"
2. period—A JSON Object representing ISO-8601 Periods As explained here, segments are loaded and dropped from the cluster based on a set of rules (See discussion of FIG. 9 below). Rules can indicate how segments should be assigned to different historical node tiers and how many replicants of a segment should exist in each tier. Rules may also indicate when segments should be dropped entirely from the cluster. The coordinator loads a set of rules from the database. Rules may be specific to a certain data source and/or a default set of rules can be configured. Rules are read in order and hence the ordering of rules can be important. The coordinator can cycle through all available segments and match each segment with the first rule that applies. Each segment will therefore be controlled by a single rule (i.e., the first one it matches).

Cleaning Up Segments

Each run, the Druid coordinator can compare the list of available database segments in the database with the current segments in the cluster. Segments that are not in the database but are still being served in the cluster can be flagged and appended to a removal list. Segments that are overshadowed (their versions are too old and their data has been replaced by newer segments) can also be dropped (see discussion above regarding segment merging).

Segment Availability

If a historical node restarts or becomes unavailable for any reason, the Druid coordinator will typically notice a node has gone missing and treat all segments served by that node as being dropped. Given a sufficient period of time, the segments may be reassigned to other historical nodes in the cluster. However, each segment that is dropped is not immediately forgotten. Instead, there can be a transitional data structure that stores all dropped segments with an associated lifetime. The lifetime represents a period of time in which the coordinator will not reassign a dropped segment. Hence, if a historical node becomes unavailable and available again within a short period of time, the historical node will start up and serve segments from its cache without any of those segments being reassigned across the cluster.

Balancing Segment Load

To assist with an even distribution of segments across Historical nodes in the cluster, the coordinator node can find the total size of all segments being served by every historical node each time the coordinator runs. For every Historical node tier in the cluster, the coordinator node can determine the Historical node with the highest utilization and the historical node with the lowest utilization. The percent difference in utilization between the two nodes can be computed, and if the result exceeds a certain threshold, a number of segments can be moved from the highest utilized node to the lowest utilized node. There can be a configurable limit on the number of segments that can be moved from one node to another each time the coordinator runs. Segments to be moved can also be selected at random and only moved if the resulting utilization calculation indicates the percentage difference between the highest and lowest servers has decreased.

Figure 9:
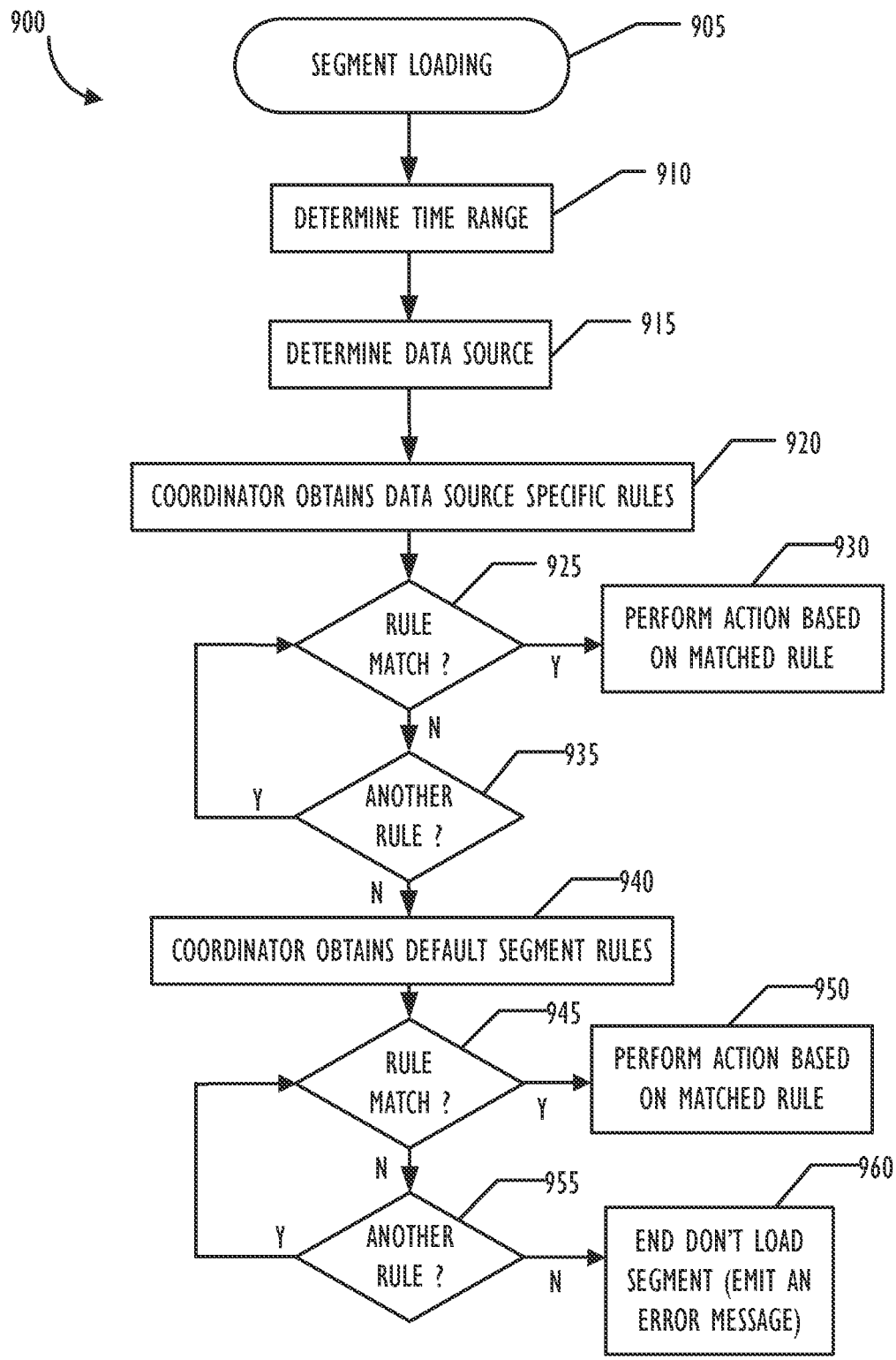
FIG. 9 illustrates a flowchart 900 for one method of one or more coordinator nodes controlling loading segments of data stored in a database of time stamped records according to one or more disclosed embodiments.

Referring now to FIG. 9, process 900 begins at block 905. A segment time range is determined (block 910). As mentioned above, each segment inherently is associated with a time range and a data source. The data source is determined at block 915. The coordinator node(s) can then obtain any data source specific rules (block 920). For each rule the segment is compared to see if it matches (925). If a match is found (Yes prong of block 925), control is passed to block 930 where the segment is loaded and the process ends. Alternatively, if no match is found (NO prong of block 925), a next rule is checked for a match. After all data source specific rules have been checked (block 935) control can flow to block 940 where default segment rules can be obtained and similarly check for matches as indicated by blocks 945 and 955. When a match is found (Yes prong of block 945) control can pass to block 950 to load the segment based on the matching default rule. When no matches are found and all rules are exhausted control can pass to block 960 to end the process without loading the segment and optionally initiate an error message that no segment rule was matched. Obviously, other implementations are possible and the order of these steps may be changed to achieve the same result of loading a segment based on its first matching data source specific rule and then first matching default rule.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

The following examples pertain to further embodiments of this disclosure. Specifics in the examples may be used anywhere in one or more embodiments.

APPENDIX A (Broker)

Quick Start

Run:

io.druid.cli.Main server broker

With the following JVM configuration:

```
-server
-Xmx256m
-Duser.timezone=UTC
-Dfile.encoding=UTF-8
druid.host=localhost
druid.service=broker
druid.port=8080
druid.zk.service.host=localhost
```

JVM Configuration

The broker module can use several of the default modules described with respect to "Configuration" and can have one or more of the following set of configurations as well:

| Property | Description | Default |
|---|---|---|
| druid.broker.cache.type | Choices: local, memcache. The type of cache to use for queries. | local |

Local Cache

| Property | Description | Default |
|---|---|---|
| druid.broker.cache.sizeInBytes | Maximum size of the cache. If this is zero, cache is disabled. | 0 |
| druid.broker.cache.initialSize | The initial size of the cache in bytes. | 500000 |
| druid.broker.cache.logEvictionCount | If this is non-zero, there will be an eviction of entries. | 0 |

Memcache

| Property | Description | Default |
|---|---|---|
| druid.broker.cache.expiration | Memcache expiration time. | 2592000 (30 days) |
| druid.broker.cache.timeout | Maximum time in milliseconds to wait for a response from Memcache. | 500 |
| druid.broker.cache.hosts | Memcache hosts. | none |
| druid.broker.cache.maxObjectSize | Maximum object size in bytes for a Memcache object. | 52428800 (50 MB) |
| druid.broker.cache.memcachedPrefix | Key prefix for all keys in Memcache. | druid |

Running
io.druid.cli.Main server broker

APPENDIX B (Coordinator)

Quick Start
Run:
io.druid.cli.Main server coordinator
With the following JVM configuration:

```
-server
-Xmx256m
-Duser.timezone=UTC
-Dfile.encoding=UTF-8
```

-continued

```
druid.host=localhost
druid.service=coordinator
druid.port=8082
druid.zk.service.host=localhost
druid.db.connector.connectURI=jdbc\:mysql\://localhost\:3306/druid
druid.db.connector.user=druid
druid.db.connector.password=diurd
druid.coordinator.startDelay=PT60s
```

JVM Configuration

The "Coordinator" module can use several of the default modules described with respect to "Configuration" and can have the following set of configurations as well:

| Property | Description | Default |
|---|---|---|
| druid.coordinator.period | The run period for the coordinator. The coordinator's | PT60S |

| Property | Description | Default |
| --- | --- | --- |
| | operates by maintaining the current state of the world in memory and periodically looking at the set of segments available and segments being served to make decisions about whether any changes need to be made to the data topology. This property sets the delay between each of these runs. | |
| druid.coordinator.period.indexingPeriod | How often to send indexing tasks to the indexing service. Only applies if merge or conversion is turned on. | PT1800S (30 mins) |
| druid.coordinator.startDelay | The operation of the Coordinator works on the assumption that it has an up-to-date view of the state of the world when it runs, the current ZK interaction code, however, is written in a way that doesn't allow the Coordinator to know for a fact that it's done loading the current state of the world. This delay is a hack to give it enough time to believe that it has all the data. | PT300S |
| druid.coordinator.merge.on | Boolean flag for whether or not the coordinator should try and merge small segments into a more optimal segment size. | PT300S |
| druid.coordinator.conversion.on | Boolean flag for converting old segment indexing versions to the latest segment indexing version. | false |
| druid.coordinator.load.timeout | The timeout duration for when the coordinator assigns a segment to a historical node. | 15 minutes |
| druid.manager.segment.pollDuration | The duration between polls the Coordinator does for updates to the set of active segments. Generally defines the amount of lag time it can take for the coordinator to notice new segments. | PT1M |
| druid.manager.rules.pollDuration | The duration between polls the Coordinator does for updates to the set of active rules. Generally defines the amount of lag time it can take for the coordinator to notice rules. | PT1M |
| druid.manager.rules.defaultTier | The default tier from which default rules will be loaded from. | _default |

Dynamic Configuration

The coordinator can have a dynamic configuration model to change certain behaviors on the fly. The coordinator a JSON spec object from the Druid MySQL config table. One possible example of this object is detailed below:

A sample worker setup spec is shown below:

```
{
    "millisToWaitBeforeDeleting": 900000,
    "mergeBytesLimit": 100000000L,
    "mergeSegmentsLimit" : 1000,
    "maxSegmentsToMove": 5,
    "replicantLifetime": 15,
    "replicationThrottleLimit": 10,
    "emitBalancingStats": false
}
```

Issuing a GET request at the same URL will return the spec that is currently in place. A description of an example of the config setup spec is shown below.

| Property | Description | Default |
| --- | --- | --- |
| millisToWaitBeforeDeleting | How long does the coordinator need to be active before it can start deleting segments. | 90000 (15 mins) |
| mergeBytesLimit | The maximum number of bytes to merge (for segments). | 100000000L |

| Property | Description | Default |
| --- | --- | --- |
| mergeSegmentsLimit | The maximum number of segments that can be in a single merge task. | Integer.MAX_VALUE |
| maxSegmentsToMove | The maximum number of segments that can be moved at any given time. | 5 |
| replicantLifetime | The maximum number of coordinator runs for a segment to be replicated before we start alerting. | 15 |
| replicationThrottleLimit | The maximum number of segments that can be replicated at one time. | 10 |
| emitBalancingStats | Boolean flag for whether or not we should emit balancing stats. This is an expensive operation. | false |

What is claimed is:

1. A non-transitory computer readable medium comprising computer executable instructions stored thereon to cause one or more processors to perform data storage and retrieval operations from a computer memory configured according to a distributed database of time stamped records collected into data segments, each data segment including data from a data source collected over a time interval, each data segment associated to a creation time that the data segment was created, each data segment stored on one of a plurality of query nodes, the operations comprising:

building a timeline data structure for the data source and for a timeline view interval, the building of the timeline data structure comprising:

identifying, data segments that include data from the data source that was collected over a time interval included in the timeline view interval;

identifying, among the identified data segments, overlapping data segments that include overlapping portions of data collected over an overlapping time interval;

selecting the overlapping portion that is included in the overlapping segment having the most recent creation time; and building the timeline data structure with the selected overlapping portion and with portions of the identified data segments that do not overlap with any portion of any other of the identified data segments.

2. The non-transitory computer readable medium of claim 1, wherein the operations further include:

receiving a query request at a broker node from a query client;

identifying, using the timeline data structure, data segments that include a most recent set of available data applicable to the query request;

retrieving the identified data segments:

generating a query response by consolidating the most recent set of available data included in the retrieved data segments; and returning a query response to the query client.

3. The non-transitory computer readable medium of claim 1, wherein each query node is either a historical node or a real-time node.

4. The non-transitory computer readable medium of claim 2, wherein retrieving the identified data segments further comprises checking a cache for the identified data segments.

5. The non-transitory computer readable medium of claim 4, wherein the query request is not sent to query nodes for segments located in the cache.

6. The non-transitory computer readable medium of claim 4, wherein the cache is local to the broker node.

7. The non-transitory computer readable medium of claim 2, wherein the query client comprises a graphical user interface on a client computer.

8. The non-transitory computer readable medium of claim 2, wherein the query client comprises a computer process executing on a computer different from the broker node.

9. A non-transitory computer readable medium comprising computer executable instructions stored thereon to cause one or more processing units to perform data storage and retrieval operations from a computer memory configured according to a distributed database of time stamped records collected into data segments, the operations comprising:

determining, from among the data segments, a plurality of merger segments to merge into a single merged segment based on at least one of a size of each of the merger segments, a size of a resulting merged segment, and machine resources providing infrastructure to the distributed database of time stamped records, each merger segment comprising segment data in the form of at least one of a dimension and a metric;

determining at least one overlapping dimension included in every one of the plurality of merger segments to merge;

combining merger segment data for each of the at least one overlapping dimension;

determining at least one non-overlapping dimension that is not included in at least one of the plurality of merger segments to merge; and assigning a null value for each non-overlapping dimension.

10. The non-transitory computer readable medium of claim 9, the operations further comprising:

define a merged time interval spanning from an earliest start time of the plurality of merger segments to a latest finish time of the plurality of merger segments.

11. The non-transitory computer readable medium of claim 9, wherein each created segment has a unique version associated to a creation time that the data segment was created.

12. A method for storing and retrieving data from a computer memory, comprising:

configuring said computer memory according to a distributed database of time stamped records collected into data segments;

determining, from among the data segments, a plurality of merger segments to merge into a single merged segment based on at least one of a size of each of the merger segments, a size of a resulting merged segment, and machine resources providing infrastructure to the distributed database of time stamped records, wherein each merger segment comprises segment data in the form of at least one of a dimension and a metric;

determining at least one overlapping dimension included in every one of the plurality of merger segments to merge;

combining merger segment data for each of the at least one overlapping dimension;

determining at least one non-overlapping dimension that is not included in at least one of the plurality of merger segments to merge;

assigning a null value for each non-overlapping dimension associating the merged segment with a time stamp corresponding to a time that the plurality of merger segments was merged into the single merged segment.

13. The method of claim 12, further comprising:
determining at least one overlapping metric included in every one of the plurality of merger segments to merge;
combining merger segment data for each of the at least one overlapping metric;
determining at least one non-overlapping metric that is not included in at least one of the plurality of merger segments to merge; and
assigning a null value for each non-overlapping metric.

14. The method of claim 12, further comprising:
define a merged time interval spanning from an earliest start time of the plurality of merger segments to a latest finish time of the plurality of merger segments.

15. The method of claim 12, wherein each created segment has a unique version associated to a creation time that the data segment was created.

* * * * *